G. W. ALLEN.
FRUIT DISTRIBUTING TROUGH.
APPLICATION FILED FEB. 8, 1912.
1,063,762.
Patented June 3, 1913.
2 SHEETS—SHEET 2.
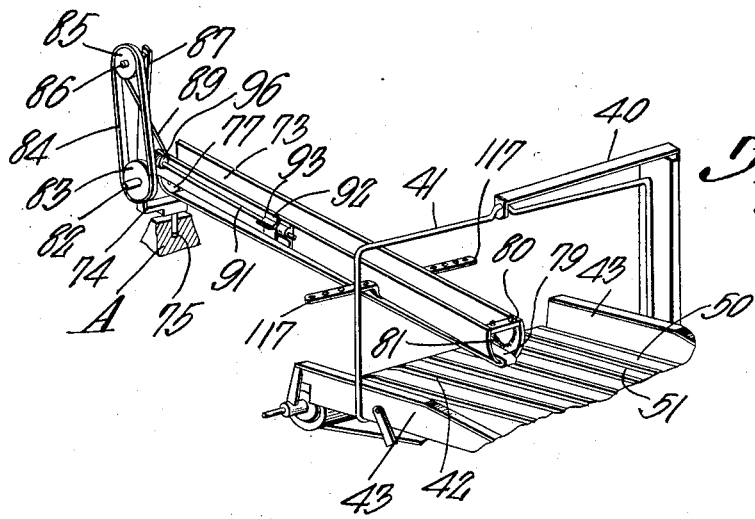
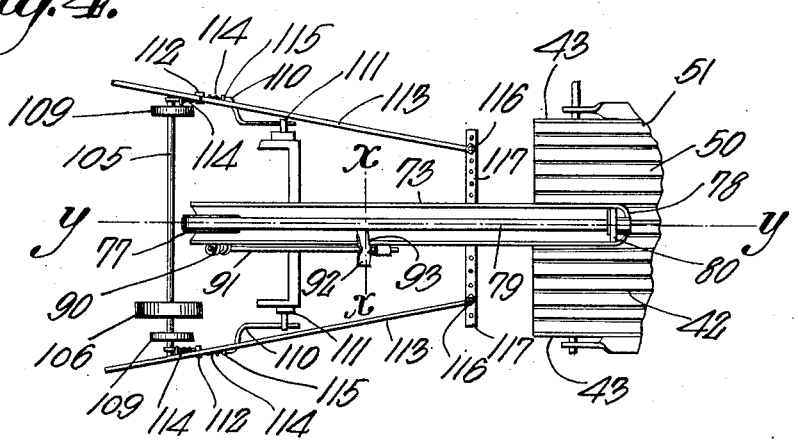
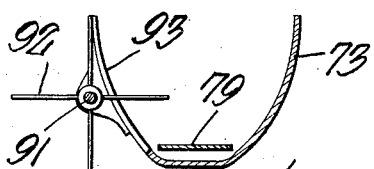
Witnesses
George W. Allen, Inventor
by C. A. Snow & Co., Attorneys

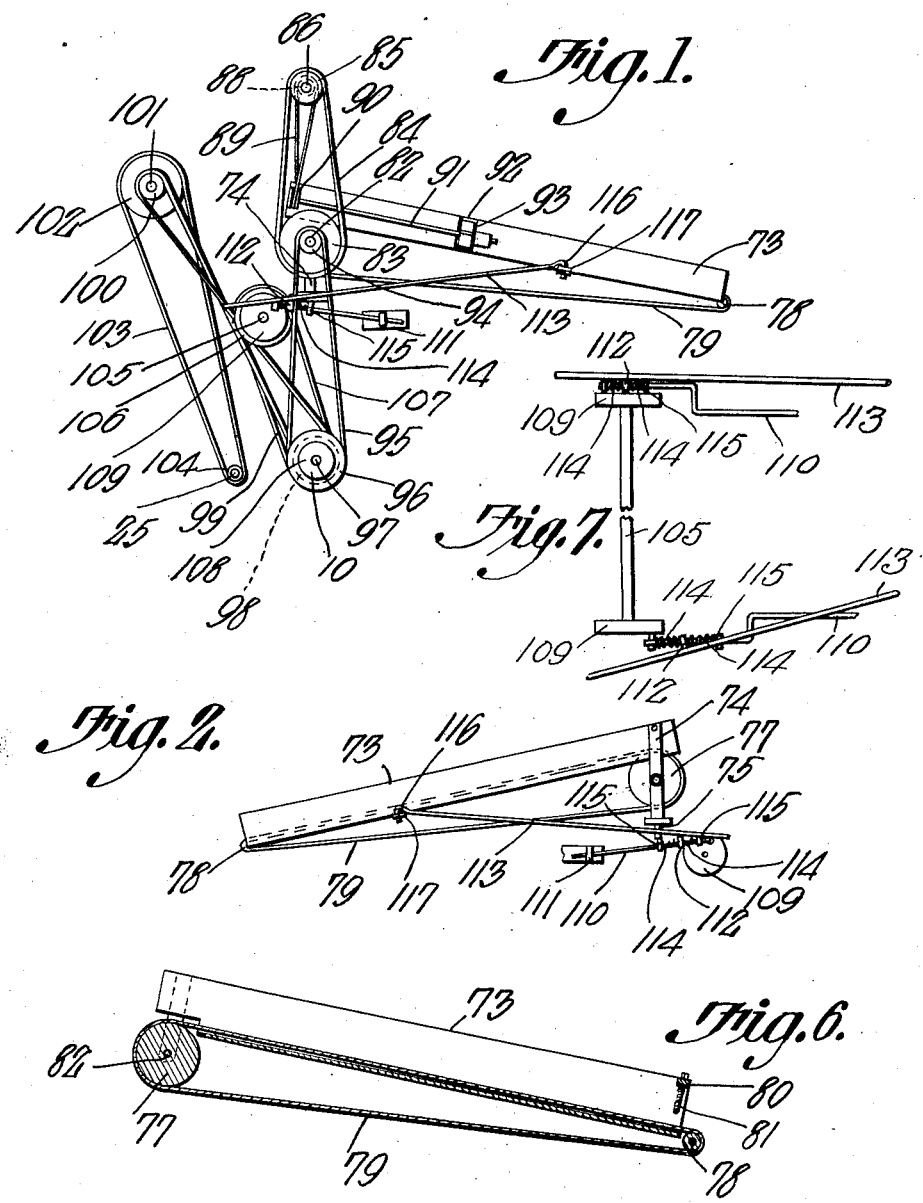

UNITED STATES PATENT OFFICE.

GEORGE W. ALLEN, OF SELMA, CALIFORNIA.

FRUIT-DISTRIBUTING TROUGH.

1,063,762.     Specification of Letters Patent.     Patented June 3, 1913.

Original application filed October 11, 1911, Serial No. 654,168. Divided and this application filed February 8, 1912. Serial No. 676,374.

*To all whom it may concern:*

Be it known that I, GEORGE W. ALLEN, a citizen of the United States, residing at Selma, in the county of Fresno and State of California, have invented a new and useful Fruit - Distributing Trough, of which the following is a specification.

This invention relates to fruit distributing troughs for use in connection with machines for filling trays with cut fruit, and the invention is more particularly a division of an application filed by me on October 11, 1911, said application bearing Serial No. 654,168.

One of the objects of the invention is to provide means for use in connection with a fruit spreading table whereby cut fruit will be distributed evenly throughout the width of the table.

A further object is to provide means whereby the cut fruit, while passing through the feeding means, will be shifted so as to bring its cut or flat face uppermost prior to being discharged onto the spreading table.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—Figure 1 is a side elevation of the trough and its operating mechanism. Fig. 2 is an elevation of the trough and adjacent mechanism and viewed from the opposite side to that shown in Fig. 1. Fig. 3 is a perspective view of the apparatus, portions of the mechanism being removed, and a portion of the spreading table being shown adjacent to the trough. Fig. 4 is a plan view of the trough and its mechanism, a portion of the spreading table being shown in plan. Fig. 5 is a section on line X—X Fig. 4. Fig. 6 is a section on line Y—Y Fig. 4. Fig. 7 is a plan view showing the relative positions of the disks and rods.

Referring to the figures by characters of reference 42 designates the feed box of a spreading table such as constitutes the subject matter of the application hereinbefore referred to, there being a yoke 41 for supporting said feed box from a fixed arm 40.

The mechanism devised for supplying cut fruit to the box 42 of the spreading table constitutes the subject matter of the present invention. This mechanism includes an elongated trough 73 mounted at one end within and fixedly connected to a yoke 74. This yoke has a stem 75 extending downwardly therefrom and mounted to rotate within a supporting structure indicated generally at A. This structure may form a part of a fruit cutter and pitter or can constitute a portion of any other machine designed to cut fruit and supply it to the trough.

A pulley 77 is journaled within the yoke 74 and extends into the upper or inlet end of the trough and another smaller pulley 78 is mounted at the outlet end of the trough. An endless belt 79 is mounted on the pulleys 77 and 78 and the upper run of the belt extends longitudinally within and constitutes the bottom of the trough. The trough is inclined downwardly toward and overhangs the feed box 42 and a cross strip 80 is secured within the upper portion of the outlet end of the trough and supports a spring loop 81 which extends downwardly close to the belt 79. Pulley 77 is secured to a shaft 82 journaled in suitable supports, not shown, and another pulley 83 is secured to this shaft and transmits motion, through a belt 84 to a pulley 85 secured to a shaft 86, said shaft being journaled in a standard 87 extending upwardly from the yoke 74.

A pulley 88 is secured to and rotates with the shaft 86 and drives a belt 89 which, in turn, engages a pulley 90 secured to one end of a shaft 91. This shaft is arranged longitudinally along one side of the trough 73 and has a fan 92 secured thereto and the blades of which move successively into an opening 93 formed in one side of the trough.

A pulley 94 is secured to the shaft 82 and receives motion, through a belt 95 from a pulley 96 which, in turn, is secured to a shaft 97. A pulley 98 is secured to this shaft 97 and receives motion, as through a cross belt 99, from a pulley 100 which is secured to a shaft 101. Another pulley 102 is secured to this shaft and receives motion through a belt 103, from a pulley 104 on the drive shaft 25.

A shaft 105 is journaled above the shaft 97 and has a pulley 106 secured thereto. This pulley receives motion, through a belt 107, from a pulley 108 secured to shaft 97.

Disks 109 are secured to the end portions of the shaft 105 and each disk has a rod 110 pivotally connected to it and mounted within a guide 111, carried by a suitable supporting structure (not shown). Said rod extends through an eye 112 formed at one end of a connecting rod 113, there being springs 114 on the rod 110 and bearing against opposite faces of the eye 112, the said springs being held in place by means of pins 115 or the like. The connecting rods 113 have hooks 116 at their free ends and these hooks are adapted to engage arms 117 extending laterally from the trough 73. The rods 110 are connected to the disks 109 at diametrically opposed points, so that, when the two disks 109 rotate in unison, the rods 110 and 113 at one side of the machine will be projected forwardly while the other rods are being retracted. Thus it will be seen that the trough 73 will be swung laterally, first to one side and then to the other, this movement being sufficient to cause the discharge end of the trough to travel from one side wall 43 to the other of the feed box 42.

It is to be understood that when the cut fruit is applied to the upper or inlet end of the trough 73, it will be moved downwardly within the trough by the belt 79 and, as each piece of fruit arrives opposite the rotating fan 92, one of the blades of the fan will strike the fruit and, if the flat or cut face of the piece of fruit is lowermost, the flat blade will engage said face and turn the piece of fruit so as to bring its convex face lowermost. If said convex face is lowermost when the fruit reaches the fan, said fan, upon contacting with the fruit will have no effect thereon. This has been found by actual practice. Should any pieces of fruit pass the fan without being properly righted, they will come into engagement with the spring loop 81 and this loop will tilt the pieces of fruit so as to bring their convex faces lowermost, the loop being slidably engaged by the flat face of the piece of fruit passing thereunder. Upon leaving the trough the fruit will be deposited on one or more of the belts 50 and 51 in the feed box and it is to be understood that during the passage of the fruit down the trough said trough will be swung toward the two sides of the feed box successively, thus trough will be held at each side of the feed box. By providing the disks 109 and the parts operated thereby for oscillating the trough 73, it will be apparent that the trough will be held at each side of the feed box a sufficient length of time to permit two pieces of fruit to leave the trough before said trough begins its return movement. This is necessary in order that the fruit may be deposited in parallel rows, each row extending throughout the width of the feed box.

What is claimed is:—

1. The combination with a feed box, of an inclined trough discharging thereinto, and means within the trough for positioning pieces of cut fruit with their cut or flat faces uppermost.

2. The combination with a feed box, of a distributing element discharging into the feed box and including an inclined trough, means for swinging the trough laterally from side to side of the feed box, and means within the trough for positioning pieces of cut fruit with their flat or cut faces uppermost.

3. The combination with a feed box, of fruit distributing means including a trough discharging onto the feed box, a blade projecting into one side of the trough and mounted for rotation, and means for actuating the blade to engage pieces of fruit to position them in the trough with their cut or flat faces uppermost.

4. The combination with a feed box, of a distributing element discharging thereunto and including a trough, means for swinging the discharge end of the trough from one side to the other of the feed box, a revoluble element connected to the trough for positioning pieces of fruit with their cut or flat faces uppermost, and a yielding element supported within the trough for engaging the fruits to position them with their flat faces uppermost.

5. The combination with a feed box, of fruit distributing means discharging into the feed box and including a trough inclined downwardly toward the feed box, said trough being pivotally mounted at its upper end, means for oscillating the trough laterally about said pivot to discharge fruit into the feed box from one side to the other of the box, means for conveying fruit downwardly within the trough to the outlet end thereof, and means within the trough for positioning pieces of cut fruit with their flat or cut faces uppermost.

In testimony that I claim the foregoing as my own, I have hereto affixed my signature in the presence of two witnesses.

GEORGE W. ALLEN.

Witnesses:
C. C. CORLEW,
N. LINDSAY SOUTH.

---

Copies of this patent may be obtained for five cents each, by addressing the "Commissioner of Patents, Washington, D. C."